United States Patent [19]  
Wittenwyler

[11] 3,865,777  
[45] Feb. 11, 1975

[54] CURING OF POLYEPOXIDE BASED FOUNDRY CORES WITH A CURING AGENT CONTAINING A LIQUID HYDROCARBON AND A BORON TRIFLUORIDE COMPLEX

[75] Inventor: Clifford V. Wittenwyler, Cherry Hill, N.J.

[73] Assignee: Shell Oil Company, Houston, Tex.

[22] Filed: Feb. 25, 1974

[21] Appl. No.: 445,187

Related U.S. Application Data

[63] Continuation-in-part of Ser. No. 336,860, Feb. 28, 1973, abandoned.

[52] U.S. Cl......... 260/37 EP, 164/43, 260/33.6 EP, 260/DIG. 40
[51] Int. Cl............................................. C08g 51/04
[58] Field of Search.. 260/33.6 EP, 37 EP, DIG. 40; 164/43

[56] References Cited
UNITED STATES PATENTS
3,705,872  12/1972  Wittenwyler.................... 260/37 EP Primary Examiner—Donald E. Czaja
Assistant Examiner—S. M. Person

[57] ABSTRACT

Foundry cores are prepared by (1) mixing from about 90 to 99 parts by weight of foundry sand with from 1 to 10 parts by weight of a polyepoxide binder, (2) mixing said blend with a curing amount of a curing agent comprising an organic boron trifluoride complex, (especially boron trifluoride etherate) blended with a high boiling, aromatic liquid hydrocarbon, and optionally a polyoxyethylene surfactant, (3) packing the blend into suitable molds and (4) allowing the polyepoxide to cure. A curing agent useful in the preparation of foundry cores comprises a blend of a boron trifluoride complex with a high boiling substantially aromatic, liquid hydrocarbon, and optionally with a surfactant. A curable composition comprises (a) 90–99 parts by weight sand (b) 1–10 parts by weight a liquid polyepoxide, and (c) a curing amount of the above defined curing agent.

23 Claims, No Drawings

3,865,777

CURING OF POLYEPOXIDE BASED FOUNDRY CORES WITH A CURING AGENT CONTAINING A LIQUID HYDROCARBON AND A BORON TRIFLUORIDE COMPLEX

This is a continuation-in-part of patent application Ser. No. 336,860, filed Feb. 28, 1973 and now abandoned.

BACKGROUND OF THE INVENTION

1. Field of the Invention

This invention is a process for the ambient temperature preparation of polyepoxide based foundry cores. Another aspect of this invention provides for a curable composition useful in the preparation of polyepoxide based foundry cores, while still another aspect of this invention is a curing agent useful in ambient temperature preparation of polyepoxide based foundry cores.

2. Prior Art

In the foundry industry, foundry cores are used in helping to shape that part of a casting not readily shaped by the mold proper. With today's high production rates, modern foundry practice requires rapid core production and sometimes requires that foundry cores be made on a 1 to 10 minute cycle without heat curing. Not only do metal foundries require a fast curing core, but the core also should be low cost and high in tensile strength.

Presently various resins, such as the B-staged phenol-formaldehydes, urethane and furan resins are used to bond sand into such required shapes, but they generally require rather extensive heating of the core box to effect the required core (Introduction to Foundry Technology, Ekey, D.C. and Winter, W.P., McGraw-Hill Book company, Inc., New York City, 1958). Although these resins result in adequate cores, the heating often results in a short life for the core box, dimensional changes in the core as it cools, non-uniform curing due to poor heat transfer, especially in large pieces, and inefficient use of the core box because of the long cure time. Recent developments, however, have resulted in, for example, furan nobake foundry cores (see U.S. Pat. No. 3,644,274 to Marerukas). Although these phenol-formaldehyde, urethane and furan resins are generally less expensive than epoxy based resin systems, with which the present invention is concerned, the cure rate is still generally longer than foundry personnel desire.

Much work has been done to find an epoxy based foundry core which develops its full usable strength within a short period of time. For example, processes have been described wherein epoxy wetted sand mixtures are placed in mold forms and a gas, such as ammonia or boron trifluoride, is passed through the permeable mass to effect the cure of the epoxy resin and form the foundry core. (See for example U.S. Pat. No. 3,107,403) However, these methods were never completely satisfactory because of permeation difficulties when intricate shapes are used and thus portions of the cores do not cure sufficiently. Moreover, the use of boron trifluoride gas is further hampered by toxicity, humidity, corrosion and pollution problems.

Thus, it will be appreciated that many of the currently used processes for manufacturing foundry cores or molds suffer from one or more of the following shortcomings: (1) special machinery required, (2) high material cost, (3) slow cure rate, (4) high toxicity, (5) high corrosion rate, (6) high temperature cures (7) long post cures and (8) poor handling qualities.

A process employing a polyepoxide binder which effectively overcame the objections to the known methods is described in my U.S. Pat. No. 3,705,872 issued Dec. 12, 1972. This method involved blending said with a polyepoxide binder, mixing the blend with a boron trifluoride dihydrate in an aliphatic polyol, packing the mixture in molds, and allowing to cure at ambient temperatures. Although this process exhibited many attractive features, it has been found that at high humidities, i.e., more than 50 percent relative humidity, there is a reduction in cure rates as well as tensile strength of the cured core. Further, on large core molds it has been found that there is an undesirable amount of surface erosion which results in imperfections in the metal castings.

Surprisingly, it has now been found that these problems can be overcome by using as a curing agent in the polyepoxide based system an organic boron trifluoride complex blended with a high boiling, substantially aromatic, liquid hydrocarbon, and optionally a polyoxyethylene surfactant instead of an organic boron trifluoride complex in an aliphatic polyol. Although the reason for the improvement is not completely understood, it is thought that the aliphatic polyol, such as polypropylene glycol, is hydrophilic and thus absorbs water while the aromatic hydrocarbon/surfactant is hydrophobic and thus reduces the sensitivity of the cured sand core binder to the presence of water.

Although high boiling, aromatic, liquid hydrocarbons have been used as epoxy modifiers for non-permeable, unfilled or partially filled epoxy systems, e.g., in electrical castings or terrazo floors where filler amounts to about 88 percent or less of the applied topping and dries so that it can be ground in 24 to 48 hours, it is surprising that the use of such hydrocarbons in the curing agent are effective in a fast curing, permeable foundry core system to overcome the strength and erosion problems which occur using the aliphatic polyol/boron trifluoride dihydrate curing agent.

SUMMARY OF THE INVENTION

This invention provides a process for the preparation of foundry cores which involves
a. blending about 90 to 99 parts by weight of inert particles with about 1 to 10 parts by weight of a liquid polyepoxide binder;
b. mixing the blend of (a) with a curing amount of a curing agent comprising an organic boron trifluoride complex blended in a high boiling, substantially aromatic, liquid hydrocarbon and optionally a polyoxyethylene surfactant,
c. packing the mixture of (b) into molds; and
d. allowing the mixture to cure at ambient temperatures. The process can also be carried out by carrying out steps (a) and (b) simultaneously.

This invention also is an epoxy curing agent which consists essentially of
a. about 5 to 50 parts by weight of an organic boron trifluoride complex blended with;
b. about 50 to 95 parts by weight of a high boiling, substantially aromatic, liquid hydrocarbon; and
c. optionally up to about 20 parts by weight of a polyoxyethylene surfactant.

A further aspect of this invention includes a curable composition comprising
a. about 90 to 99 parts by weight foundry sand;

b. about 1 to 10 parts by weight of a liquid polyepoxide binder;
c. about 1 to 40 parts by weight per 100 parts by weight polyepoxide binder of a curing agent which comprises
  i. about 5 to 50 parts by weight of an organic boron trifluoride complex blended with;
  ii. about 50 to 95 parts by weight of a high boiling, substantially aromatic, liquid hydrocarbon; and
  iii. optionally up to about 20 parts by weight of a polyoxyethylene surfactant.

DESCRIPTION OF THE PREFERRED EMBODIMENTS

The Process

The process of this invention is a method primarily used for preparing foundry cores from sand, but the method is also suitable for manufacturing pourous, low-cost, light weight products such as filter media, building bricks, syntactic foams and vacuum forming molds.

Uses for such composite sand-resin materials prepared by the process of this invention are as filter media for oil and gasoline in combustion engines and elsewhere, building bricks particularly for decorative purposes, syntactic foams where light weight and high-strength is required. Also, strong, chemically resistant panels can be made when random fibers are bonded in the above manner.

Porous dies made with this material for forming thermoplastic sheet apply vacuum uniformly for good reproduction. Air can be applied to remove the part and cool the die. Dies for pressure moldings can be heated and/or cooled during the molding cycle by passing fluids through the die. Fine metal particles may be substituted for the sand to improve maleability and heat dissipation.

As noted hereinbefore, the present invention is primarily a process for preparing foundry cores and the following disclosure will be directed more particularly to the production of foundry cores. It is understood that such description does not limit the invention.

In general, the actual techniques involved in foundry core preparation form no part of the present invention and any conventional technique for forming such sand cores may be employed.

In one embodiment, the sand and the polyepoxide binder are mixed thoroughly by conventional mixing techniques. This blend is stable since no curing agent is present and may be stored indefinitely. Before use, the curing agent is added to the resin-sand blend so that the ratio of curing agent to polyepoxide is about 0.1 to about 40.0, and preferably 1.0 to 25.0 parts, per 100 parts by weight of the polyepoxide. The resulting blend is then packed into a suitable mold and the mass allowed to cure. The second mixing step is readily achieved in 30 seconds using conventional mixing equipment and the resulting sand core system then cures in about 2 to 5 minutes at ambient temperatures to provide a useable core. The vigorous exotherm from the reaction is contained by the heat capacity of the sand.

Alternatively both the polyepoxide binder and the curing agent can be added to the sand simultaneously in a continuous sand mixer. Again, since there is a great excess of sand, it acts as a heat sink and the heat from the reaction is contained.

In general then real improvements in the quality of the final foundry core result by using the particular curing agent of this invention in the process of preparing foundry cores by (a) blending a foundry sand with a polyepoxide binder (b) mixing (either simultaneously or subsequently) the blend of (a) with a curing agent, (c) packing the resulting mixture in molds and (d) allowing to cure at ambient temperatures.

In the usual practice of the invention, sand or other suitable foundry core-forming inert particles will be used as the filler. In general, the inert particles should be finely divided and have a mesh size varying from about 4 to 300, and preferably should be a homogenous mixture of particles having an American Foundry Society (AFS) grain fineness number of from 30 to 90 (AFS30 to AFS90). Suitable inert materials include, among others, sand, crushed rocks, metal powders, chips, ground walnut shells, spheres, crushed quartz, aluminum oxide, hollow glass or plastic spheres or glass fibers and finely divided resinous particles. Mixtures of various types of particles may also be used. Preferred are the minerals, especially the siliceous materials such as, for example, sand and ground rock. Especially preferred is silica sand.

It has been found that washed silica, zircon, chromite and aluminum silicate give excellent response. Best results have been obtained using relatively dry sand; that is, the moisture content is less than 0.5 percent by weight (percent W) and preferably will be less than the percentage at which the curing agent is present. That is, if the binder is present at 1 percent W of sand then the curing agent is present at a level of 0.2 percent w of sand, total moisture should not exceed 0.2 percent w of sand.

In general, the sand-polyepoxide blend comprises from about 90 to 99 parts by weight of inert material (sand) and, from about 1 to 10 parts by weight of polyepoxide binder. For most foundry core applications, however, the blend comprises from about 95 to 99 parts by weight of sand and from about 1 to 5 parts by weight of polyepoxide.

In general, the sand and the polyepoxide binder are blended at ambient temperatures of from about 75°F to 120°F, and at atmospheric pressure.

THE LIQUID POLYEPOXIDE BINDERS

Generally, the liquid polyepoxide binders useable in the process and curable composition of this invention include polyepoxides which are liquids by themselves, mixtures of polyepoxides and non-polyepoxide diluents, and liquid mixtures of polyepoxides.

Polyepoxides are compositions which exhibit an average of more than one vicinal epoxy group, i.e., more than one

group, per molecule. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric. It is understood that these polyepoxides may be a blend of various polyepoxides or a polyepoxide with a monoepoxide.

For clarity many of the polyepoxides and particularly those of the polymeric type are described in terms of epoxy equivalent values or "epoxy equivalency." The meaning of this expression is described in U.S. Pat. No. 2,633,458. The polyepoxides used in the present process are those having an epoxy equivalency greater than 1.0.

Various examples of polyepoxides that may be used in the process and curable composition of the invention are given in U.S. Pat. No. 2,633,458 and in U.S. Pat. No. 3,705,872 and it is to be understood that so much of the disclosure of those patents relative to examples of polyepoxides is incorporated by reference into this specification.

The polyepoxides that are particularly preferred for use in the compositions of the invention are the normally liquid glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. Pat. No. 2,633,458 are good examples of polyepoxides of this type. These are both glycidyl polyethers of 2.2-bis(4-hydroxyphenyl)propane(bis-phenol A). Especially useful is the polyether which exhibits an average molecular weight of about 340–380 and an epoxide equivalent weight of about 185–192.

Other preferred polyepoxides include the condensation products of epichlorohydrin and aliphatic polyols such as glycerol. A preferred polyepoxide of this type is a mixture of branched di- and tri-epoxides made by the condensation of epichlorohydrin and glycerol and having an epoxide equivalent weight of from about 140–160 and an average molecular weight of from about 300 to 350.

Because of high viscosities of some of the polyepoxide binders it is often advantageous to employ diluents or viscosity reducers to improve the ease of handling. Reactive diluents (which may contain epoxy groups) suitable for this purpose include phenyl glycidyl ether, butyl glycidyl ether, styrene oxide, furfural, furfuryl alcohol, glycidyl esters of alpha-branched, saturated aliphatic, monocarboxylic acids, and others.

Especially preferred as a reactive diluent are the glycidyl esters of alpha-branched, saturated monocarboxylic acids, for not only are these compounds useful for reducing viscosity, but also enter into the reaction via their epoxy groups and therefore the reactivity is not significantly reduced. Further, the branched structure of these diluents tends to improve moisture stability of the binder.

Thus, it has been found that an especially preferred binder is a mixture of a glycidyl polyether of a polyhydric phenol with a glycidyl ester of an alpha-branched saturated monocarboxylic acid. Particularly effective in this regard is a mixture of a normally liquid glycidyl polyether of 2,2bis(4-hydroxyphenyl)propane and a glycidyl ester of the formula

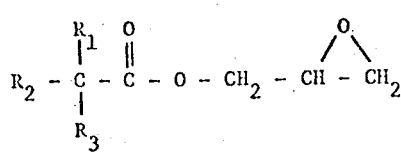

where $R_1$ and $R_2$ are alkyl radicals of 1–15 carbons and $R_3$ is a hydrogen or hydrocarbyl, and particularly useful is the glycidyl ester wherein $R_1$ and $R_2$ are each alkyl radicals such as methyl, ethyl, propyl, butyl, pentyl, nonyl, etc., and $R_3$ is hydrogen or an alkyl radical and $R_1$, $R_2$ and $R_3$ contain the sum total of from 2 to about 20 carbon atoms and preferably from about 7 to 17 carbon atoms. A very preferred glycidyl ester is the glycidyl ester of a mixture of alpha-branched, saturated, aliphatic monocarboxylic acids containing 9 to 11 carbon atoms and prepared by the process described in Example I of U.S. Pat. No. 3,268,462, issued Aug. 23, 1966. A very suitable such glycidyl ester is available commercially under the trade name of CARDURA E Resin and which is the glycidyl ester of a mixture of saturated monocarboxylic acids having a chain length of 9–11 carbon atoms, and largely consisting of tertiary acids (about 94 percent). As used herein the term glycidyl ester includes the glycidyl ester of a single acid as well as esters of mixtures of acids.

It has been found that about 80–98 parts by weight of the liquid glycidyl polyether mixed with 2–20 parts by weight of the glycidyl ester produces an effective binder. Particularly effective is a mixture of about 90–95 parts by weight of the polyepoxide with 5–10 parts by weight of the glycidyl ester. Co-reactive diluents which appear to react with the polyepoxide under the influence of the $BF_3$ complex include ethylene and propylene glycols and their polymers.

Other viscosity reducing diluents, which are non-reactive, include coal tar, pine oil, ethyl naphthalene, and xylene. Particularly useful in this regard is a high boiling, substantially aromatic, liquid hydrocarbon.

The term "high boiling" refers to a liquid which distills over a range with an initial boiling point of about 200°C to about 350°C and a final boiling point of about 300° to about 450°C as determined using the ASTM D-86-59 Distillation method. The high boiling liquid generally is not a pure compound but is a mixture of substantially aromatic hydrocarbons, that is, the liquid is comprised of organic compounds composed primarily of hydrogen and carbon atoms and exhibits 90 percent by weight or more aromaticity. Ninety percent by weight or more aromaticity means that 90 by weight or more of the liquid comprises compounds which contain two or more aromatic rings that share a pair of carbon atoms, i.e., the rings are fused. This includes such basic structures as naphthalene, anthracene and phenanthrene. Generally, the aromatic hydrocarbon compounds which make up the mixture have appended to the fused ring structure one or more side chains of lower alkyl groups of 1 to 8 carbon atoms, such as methyl, ethyl, propyl, butyl and the like. Eminently suitable as a high boiling, substantially aromatic liquid hydrocarbon for use in this invention are MOBILSOL 44 and MOBILSOL 66 Non-reactive Diluents (available from Mobil Oil Company), BARDOL B Rubber Compounding Oil (Barrett Division of Allied Chemical Company) and PANASOL AN-3 Aromatic Solvent (Amoco Chemicals Company). A preferred non-reactive diluent is a hydrocarbon mixture composed of 90–95 percent aromatic compounds with a boiling range of 215°C to 375°C, an American Petroleum Institute (API) gravity of 12–20, and a viscosity at 100°F of 35–37 Seconds, Saybolt Universal (SSU).

Also useful as a non-reactive diluent is a lower alkyl alcohol of from one to four carbon atoms, i.e. alcohols such as methyl, ethyl, propyl, isopropyl, and butyl. Preferred is isopropyl alcohol.

In general, up to about 25 percent by weight of the polyepoxide may be replaced with one or more of the above-noted reactive or non-reactive diluents. Other additives may be added as desired such as surface tension depressants, wetting agents, solvents, adhesion promoters, mold release agents, etc.

A preferred liquid, polyepoxide binder comprises
i. about 85 to 95 parts by weight of a polyepoxide (preferrably a liquid, glycidyl polyether of 2,2'-bis(4-hydroxyphenyl)propane of an average molecular weight of about 340–380 and an epoxy equivalent weight of about 185–192;
ii. about 5 to 15 parts by weight of a high boiling, substantially aromatic, liquid hydrocarbon; and
iii. about 1 to 5 parts by weight of a lower alkyl alcohol of from one to four carbon atoms, especially isopropyl alcohol.

THE CURING AGENT

The curing agent of this invention comprises an organic boron trifluoride complex blended with a high boiling, substantially aromatic, liquid hydrocarbon and optionally a polyoxyethylene surfactant. Generally there will be about 5 to 50 parts by weight organic boron trifluoride complex about 50 to 95 parts by weight aromatic liquid hydrocarbon and up to about 20 parts by weight surfactant. Preferably the curing agent will consist essentially of about 10 to 20 parts of boron complex, about 60 to 70 parts of aromatic liquid hydrocarbon and about 15 to 25 parts of surfactant and even more preferably will consist essentially of 15 parts boron complex, 65 parts aromatic liquid hydrocarbon and 20 parts surfactant.

The curing agent is used in a curing amount, i.e., that amount needed to effect the cure of the polyepoxide binder so that a useable foundry core may be formed. This usually amounts to from 1.0 to 40.0 parts by weight of the curing agent per 100 parts by weight of polyepoxide binder. Particularly effective is from 1.0 to 25.0 parts of the curing agent per 100 parts of polyepoxide binder.

BORON TRIFLUORIDE COMPLEX

Suitable organic boron trifluoride ($BF_3$) complexes for use in this curing agent include the boron trifluoride etherates, phenolates and alcoholates. Especially preferred are the etherates. Although in U.S. Pat. No. 3,705,872 the use of $BF_3$ dihydrate ($BF_3 \cdot 2H_2O$) was particularly useful and therefore preferred when used with an aliphatic polyol, that complex is of limited value in this system because of its incompatibility with the high boiling, substantially aromatic, liquid hydrocarbon used as another portion of the curing agent in this invention.

The $BF_3$ complexes may be prepared by conventional methods. The boron trifluoride etherates are simply prepared by passing $BF_3$ gas into an ether such as diethyl ether. It will be appreciated also, that the $BF_3$-phenolates are prepared by conventional techniques wherein $BF_3$ is reacted with phenol.

Especially preferred for use in the process of this invention are the boron trifluoride etherates, wherein the ether portion is of the ether structure, R-O-R, wherein R is an alkyl group of 1–8 carbon atoms such as diethyl ether, methylethyl ether, n-propyl ether, isopropyl ether and n-butyl ether. Particularly preferred because of its availability and ease of preparation the complex of $BF_3$ and diethyl ether.

THE HIGH-BOILING, AROMATIC, LIQUID HYDROCARBON

The high boiling, substantially aromatic hydrocarbon used in the curing agent of this invention is a liquid at ambient temperatures. The term "high boiling" refers to a liquid which distills over a range with an initial boiling point of about 200°C to about 350°C and a final boiling point of about 300° to about 450°C using the ASTM D-86-59 Distillation method. The high boiling liquid is generally not a pure compound but is a mixture of substantially aromatic hydrocarbons, that is, the liquid is comprised of organic compounds composed primarily of hydrogen and carbon atoms and exhibits 90% by weight or more aromaticity. Ninety percent by weight ($w$) or more aromaticity means that 90 percent w or more of the liquid comprises compounds which contain two or more aromatic rings that share a pair of carbon atoms, i.e., the rings are fused. This includes such basic structures as napthalene, anthracene and phenanthrene. Generally, the aromatic hydrocarbon compounds which make up the mixture have appended to the fused ring structure one or more side chains of lower alkyl groups of 1 to 8 carbon atoms, such as methyl, ethyl, propyl, butyl and the like. Eminently suitable as a high boiling, substantially aromatic liquid hydrocarbon for use in this invention are MOBISOL 44 and MOBISOL 66 Non-reactive Diluents (available from Mobile Oil Company), BARDOL B Rubber Compounding Oil (Barrett Division of Allied Chemical Company) and PANASOL AN-3 Aromatic Solvent (Amoco Chemicals Company). Of these, MOBILSOL 66 is preferred. Another preferred liquid hydrocarbon is an aromatic oil (a mixture) composed of 90–95% aromatic compounds with a boiling range of 215°C to 375°C, an API gravity of 12–20 and a viscosity at 100°F of 35–37 SSU.

THE POLYOXYETHYLENE SURFACTANT

Although not required in the process of this invention, in some case it is useful to add a surfactant, i.e., a coupling agent, to the high boiling, aromatic, liquid hydrocarbon to improve the miscibility of the organic boron trifluoride complex in the hydrocarbon. Nonionic surfactants are found to be most useful in this regard, especially the polyoxyethylene surfactants such as the ethoxylated alkylphenols, ethoxylated aliphatic alcohols, carboxylic esters, polyoxyethylene fatty acid amides, polyalkylene oxide block copolymers, polypropylene glycol, and the like. Preferred are the oxylated alkylphenols such as the polyoxyethylated alkylphenols wherein the alkyl group has 8 to 12 carbons, particularly preferred is polyethylene oxide nonylphenol (TRITON N-101, Rohm and Haas Company, Philadelphia, Pa.)

The following embodiments are given to further describe and illustrate the improved process of this invention. The reactants, their properties and specific ingredients as well as reaction conditions under which the process is carried out are not to be construed as limitations to the scope of the invention but are merely particular embodiments thereof. Unless otherwise specified, parts and percentages disclosed are by weight.

ILLUSTRATIVE EMBODIMENT 1

A liquid glycidyl diether of 2,2-bis(4-hydroxyphenyl) propane having an average molecular weight of approximately 330 was blended in a one pint can with a washed silica sand having an AFS 55 at a ratio of 100 parts by weight of sand and one part of resin. To this was added 0.25 part of a curing agent composed of 70 percent wt MOBISOL 66, 20 percent wt polyethylene oxide nonyl phenol, 10 percent wt boron trifluoride etherate. After the blend was thoroughly mixed using an air driven three-bladed propeller it was packed into a core tensile mold to make three test cores of 100 grams each. After three minutes the sand had a green compressive strength of 50 pounds per square inch (psi). When tensile specimens of this type were tested at 77°F 1 hour after mixing they had an average tensile strength of 180 psi.

ILLUSTRATIVE EMBODIMENT 2

The procedure of Embodiment 1 was followed except that PANASOL AN-3 was substituted for the MOBISOL 66 used in the curing agent blend. This blend was a dark amber compared to the dark brown color of the MOBILSOL blend. This core cured in 3½ minutes to fifty psi compressive strength and developed a tensile strength of 175 psi after one hour at 77°F.

ILLUSTRATIVE EMBODIMENT 3

The experiment of Embodiment 1 was repeated substituting polypropylene glycol with a molecular weight of 450 for the polyethylene oxide nonyl phenol. The tensile strength and cure time to 50 psi green compressive strength were essentially the same as Embodiment 1.

ILLUSTRATIVE EMBODIMENT 4

The experiment of Embodiment 1 was repeated except that the mixture was packed into a form which made a dry mold for a 10 inch diameter flywheel. When the mold had cured 3 minutes it was assembled and gray iron at 2550°F was poured into it. After the iron had solidified, it was removed from the mold. A smooth casting resulted even though no core wash was used on the interior surface of the mold.

ILLUSTRATIVE EMBODIMENT 5

The system described in Embodiment 1 was prepared in a foundry using a Carver [1] continuous muller. Sand was fed at a rate of 250 pounds per minute, resin at the rate of 3 pounds per minute and curing agent blend at the rate of 0.75 pound per minute. Cores weighing up to 300 pounds were made. They were removed from their core boxes after a 3 minute cure at room temperature and used to produce gray iron castings of excellent quality.

[1] Carver Foundry Products Company, Muscatine, Iowa

ILLUSTRATIVE EMBODIMENT 6

The system of Embodiment 1 except that the resin was diluted with 10% MOBISOL 66 was used to prepare test specimens. The cure time of these cores was 4 minutes at room temperature and the tensile strength after 1 hour at 77°F was 170 psi.

ILLUSTRATIVE EMBODIMENT 7

The composition of Embodiment 1 was repeated except that in place of the epoxy resin a blend of the epoxy resin with 10 percent weight of phenyl glycidyl ether was used. The cure time of this system was 5 minutes and the tensile strength was 205 psi.

ILLUSTRATIVE EMBODIMENT 8

The composition of Embodiment I was repeated except that the resin was replaced with a blend of 88%w of epoxy resin, 8 percent of MOBISOL 66 and 4 percent w of isopropyl alcohol. This blend had a viscosity of 21 poises at 77°F rather than 141 poises for the unmodified epoxy resin. This system was easier to blend with the sand. Cure time was 5½ minutes at 77°F and the tensile strength after one hour at 77°F was 188 psi.

ILLUSTRATIVE EMBODIMENT 9

The work of Embodiment 6 was repeated except that the resin component consisted of a blend of epoxy resin with an epoxide equivalent weight of 188, an aromatic oil with a boiling range of about 215°C to 315°C, an API gravity of 12–17 and a viscosity of 35-37 SSU at 100°F, and isopropyl alcohol in the ratio of 88 1 parts by weight of resin, 10 parts of oil and 2 parts of isopropyl alcohol. The blend had a viscosity of 17 poises at 75°F. The curing agent consisted of a blend of the above described oil, a polyethylene oxide nonyl phenol and boron trifluoride diethyl etherate in the ratio of 65 parts by weight of oil, 20 parts of polyethylene oxide nonyl phenol, and 15 parts of boron trifluoride etherate.

To 1,000 g of washed silica sand was added 11.25g of the above resin blend. This was stirred until a homogeneous blend resulted, then 3.75g of the above described curing agent blend was stirred in. The sand had good flowability and when packed into a mold at 75°F it hardened sufficiently to be removed in nine minutes. After one hour it had a tensile strength of 130 psi. The low viscosity of the resin provided easy mixing and good flowability, and the high oil content provided good release from the mold.

ILLUSTRATIVE EMBODIMENT 10

The work of Embodiment 1 was repeated except that chromite sand was substituted for the washed silica sand. Similar cure times and tensile strengths resulted.

ILLUSTRATIVE EMBODIMENT 11

The composition described in Embodiment 8 was used to make cores for an aluminum casting weighing 160 pounds. The aluminum was poured at a temperature of 1,300°F. After the metal had cooled sufficiently it was removed from the mold. The sand core readily decomposed at the pouring temperature and excellent shakeout of spent sand resulted. Castings produced were of excellent quality with exceptionally smooth surfaces.

ILLUSTRATIVE EMBODIMENT 12

The following table illustrates the criticallity of preforming the curring agent by mixing the boron complex into the aromatic liquid hydrocarbon and the surfactant before mixing the curing agent with the sand/epoxide blend. Only experiment 1, the process according to this invention, produces commercially usable cores.

| Experiment | | Tensile Strength (psi) After 1 Hr. Cure Time | Scratch Hardness | Comment |
| --- | --- | --- | --- | --- |
| 1. | a) Done according to the process of my invention by premixing the organic boron trifluoride complex in the aromatic liquid hydrocarbon. | 135 | 86 | Hard |
| 2. | a) Mixing the aromatic hydrocarbon with the polyepoxide binder instead of with the complex. | 18 | 22 | Crumbly, weak |
| 3. | a) Simultaneously mixing all of the ingredients. | 28 | 20 | Crumbly, weak |
| 4. | b) Mixing the aromatic liquid hydrocarbon into the boron trifluoride dihydrate curing agent of the reference cited as prior art. | 56 | 76 | Crumbly |

Ingredients used
a) 350 parts AFS testing sand, 4.2 parts resin blend, consisting of EPON Resin 828 - 90%w, SAPO-200 oil - 7%w, isopropyl alcohol - 3%w, 1.05 parts curing agent blend, consisting of $BF_3$-etherate - 10%w, SAPO-200 oil - 70%w, OXITOL Glycol Ether - 20%w.
b) 350 parts AFS testing sand, 4.2 parts resin blend, consisting of EPON Resin 828 - 90%w, SAPO-200 oil - 7%w, isopropyl alcohol - 3%w, 1.05 parts curing agent blend, consisting of 0.21 parts boron trifluoride dihydrate in 0.84 parts Shell Aromatic Process Oil 200.

ILLUSTRATIVE EMBODIMENT 13

Embodiment 1 is repeated except boron trifluoride phenolate is substituted for the boron trifluoride etherate. Satisfactory tensile strength is obtained.

ILLUSTRATIVE EMBODIMENT 14

Illustrated Embodiment 1 is repeated except boron trifluoride ethanolate is substituted for the boron trifluoride etherate. Satisfactory tensile strength is obtained.

I claim as my invention:

1. A process for preparing foundry cores which comprises
    a. blending about 90 to 99 parts by weight of foundry sand with from about 1 to 10 parts by weight of a liquid polyepoxide binder;
    b. mixing sand blend of (a) with a curing amount of a curing agent consisting essentially of
        about 5 to 50 percent by weight of an organic boron trifluoride complex blended with
        about 50 to 95 percent by weight of a high boiling, substantially aromatic, liquid hydrocarbon and with
        optionally up to about 20 percent by weight of a polyoxyethylene surfactant;
    c. packing the mixture of (b) into suitable molds; and
    d. allowing the mixture to cure at ambient temperatures.

2. The process of claim 1 wherein steps (a) and (b) are carried out simultaneously.

3. The process of claim 1 wherein the polyepoxide is a liquid glycidyl polyether of 2,2 - bis (4-hydroxyphenyl)propane.

4. The process of claim 3 wherein the liquid glycidyl polyether has an average molecular weight of about 340–380 and an epoxide equivalent weight of about 185–192.

5. The process of claim 1 wherein the liquid polyepoxide binder consists essentially of
    i. about 85 to 95 parts by weight of a polyepoxide;
    ii. about 5 to 15 parts by weight of a high boiling, substantially aromatic, liquid hydrocarbon; and
    iii. about 1 to 5 parts by weight of an alkyl alcohol of from 1 to 4 carbon atoms.

6. The process of claim 5 wherein the polyepoxide is a liquid glycidyl polyether of 2,2'-bis(4-hydroxyphenyl)propane of an average molecular weight of about 340–380 and an epoxy equivalent weight of about 185–192; the substantially aromatic, liquid hydrocarbon exhibits more than 90 percent aromaticity and distills over a range with an initial boiling point of about 200° to about 350°C and a final boiling point of about 300° to about 450°C as determined using ASTM D-86-59 distillation method; and the alkyl alcohol is isopropyl alcohol.

7. The process of claim 6 wherein the polyepoxide binder consists essentially of
    i. 85 to 90 parts by weight of the liquid glycidyl polyether,
    ii. 8 to 12 parts by weight of an aromatic oil with a boiling range of 215° to 375°C, an API gravity of 12–20, and a viscosity of 35–37 at SSU at 100°F; and
    iii. 1 to 3 parts by weight isopropyl alcohol.

8. The process of claim 1 wherein the curing agent consists essentially of
    5 to 50 percent by weight of boron trifluoride etherate blended with about 50 to 95 percent by weight of a liquid hydrocarbon which exhibits at least 90 percent aromaticity and distills over a range with an initial boiling point of about 200° to about 350°C and final boiling point of about 300° to about 450°C as determined using ASTM D-86-59 distillation method and with
    optionally up to about 20 percent by weight of a polyoxyethylated alkylphenol wherein the alkyl group contains 8 to 12 carbon atoms.

9. The process of claim 8 wherein the curing agent consists essentially of
    about 10 to 20 parts by weight boron trifluoride etherate blended with about 60 to 70 parts by weight of an aromatic oil with a boiling range of 215°C to about 375°C, an API gravity of 12–20, and a viscosity of 35–37 SSU at 100°F and
    about 15 to 25 parts by weight polyethylene oxide nonylphenol.

10. A process for preparing foundry cores which comprises
    a. blending from 90 to 99 percent weight of a foundry sand with from 1 to 10 percent by weight of a liquid polyepoxide binder consisting essentially of
        i. 85 to 90 parts by weight of a liquid glycidyl polyether of 2,2-bis(hydroxyphenyl)propane of an average molecular weight of about 340–380 and an epoxy equivalent weight of 185–192;

ii. 5–10 parts by weight of an aromatic oil with a boiling range of 215°C to about 375°C, an API gravity of 12–20 and a viscosity of 35–37 SSU at 100°F; and iii. 1–5 parts of isopropyl alcohol, b. mixing said blend of (a) with a curing agent consisting essentially of about 10 to 20 parts by weight of boron trifluoride etherate blended with from 60 to 70 parts by weight of an aromatic oil with a boiling range of 215°C to 375°C and API gravity of 12–20, and a viscosity of 35–37 SSU at 100°F and with about 15–20 parts by weight of polyethyleneoxide nonylphenol, c. packing the mixture of (b) into suitable molds, and d. allowing the mixture to cure at ambient temperatures.

11. An epoxy curing agent consisting essentially of a blend of a. about 5 to 50 parts by weight of an organic boron trifluoride complex with;

b. about 50 to 95 parts by weight of a high boiling, substantially aromatic, liquid hydrocarbon; and with c. optionally up to about 20 parts by weight of a polyoxyethylene surfactant.

12. The curing agent of claim 11 wherein the boron trifluoride complex is boron trifluoride etherate, the aromatic hydrocarbon liquid is a liquid aromatic hydrocarbon mixture which exhibits at least 90 percent by weight aromaticity and which distills over range with an initial boiling point of about 200° to 350°C and a final boiling point of about 300° to 450°C as determined using ASTM D-86-59 distillation method, and the polyoxyethylene surfactant is a polyoxyethylated alkylphenol wherein the alkyl group contains from 8 to 12 carbon atoms.

13. The curing agent of claim 12 which consists essentially of a blend of a. about 10 to 20 parts by weight of boron trifluoride etherate with;

b. about 60 to 70 parts by weight of the liquid, aromatic hydrocarbon mixture; and with c. 15–25 parts by weight of the polyoxyethylated alkyl phenol surfactant.

14. The curing agent of claim 13 which consists essentially of a blend of a. about 15 parts by weight boron trifluoride etherate with:

b. about 65 parts by weight of an aromatic oil with a boiling range from about 215°C to about 375°C, and API gravity of 12–20 and a viscosity of 35–37 SSU at 100°F; and with c. about 20 parts by weight polyethylene oxide nonyl phenol.

15. A curable composition comprising a. about 90 to 99 parts by weight foundry sand;

b. about 1 to 10 parts by weight of a liquid polyepoxide binder; and c. about 1 to 40 parts by weight per 100 parts by weight polyepoxide binder of a curing agent consisting essentially of a blend of about 5 to 50 parts by weight of an organic boron trifluoride complex with about 50 to 95 parts by weight of a high boiling substantially aromatic, liquid hydrocarbon and with optionally up to about 20 parts by weight of a polyoxyethylene surfactant.

16. The curable composition of claim 15 wherein the liquid polyepoxide binder is a liquid glycidyl polyether of 2,2'-bis(4-hydroxyphenyl)propane.

17. The curable composition of claim 16 wherein the liquid glycidyl polyether has an average molecular weight of about 340–380 and an epoxy equivalent weight of 185–192.

18. The curable composition of claim 15 wherein the liquid polyepoxide binder consists essentially of i. about 85 to 95 parts by weight of a polyepoxide;

ii. about 5 to 15 parts by weight of a high boiling, substantially aromatic, liquid hydrocarbon; and iii. about 1 to 5 parts by weight of an alkyl alcohol of from 1 to 4 carbon atoms.

19. The curable composition of claim 18 wherein the polyepoxide binder is a liquid glycidyl polyether of 2,2'-bis(4-hydroxyphenyl)propane, the liquid hydrocarbon exhibits at least 90 percent aromaticity and distills over a range with an initial boiling point of about 200° to about 350°C and a final boiling point of about 300° to about 450°C as determined using ASTM D-86-59 distillation method, and the alkyl alcohol is isopropyl alcohol.

20. The curable composition of claim 19 wherein the polyepoxide binder consists essentially of i. about 85 to 90 parts by weight of the liquid glycidyl polyether;

ii. about 8 to 12 parts by weight of an aromatic oil with a boiling range of about 215°C to about 375°C, and an API gravity of about 12–20, and a viscosity of 35–37 SSU at 100°C; and iii. 1 to 3 parts by weight isopropyl alcohol.

21. The curable composition of claim 15 wherein the organic boron trifluoride complex is boron trifluoride etherate, the liquid hydrocarbon exhibits at least 90 percent aromaticity and distills over a range with an initial boiling point of about 200° to about 350°C and a final boiling rate of about 300°C to about 450°C as determined using ASTM D-86-59 distillation method, and the polyoxyethylene surfactant is a polyoxyethylated alkyl phenol wherein the alkyl group contains 8 to 12 carbon atoms.

22. The curable composition of claim 21 wherein the curing agent consists essentially of a blend of about 10 to 20 parts by weight boron trifluoride etherate with;

about 60 to 70 parts by weight of an aromatic oil with a boiling range of 215°C to about 375°C, an API gravity of 12–20, and a viscosity of 35–37 SSU at 100°F and with about 15 to 25 parts by weight polyethylene oxide nonyl phenol.

23. A curable composition comprising a. about 90 to 99 parts by weight foundry sand;

b. about 1 to 10 parts by weight of a liquid polyepoxide binder; and c. about 1 to 40 parts by weight per 100 parts by weight polyepoxide binder of a curing agent consisting essentially of a blend of about 5 to 50 parts by weight of boron trifluoride etherate in about 50 to 95 parts by weight of high boiling, substantially aromatic, liquid hydrocarbon and optionally, up to about 20 parts by weight of a polyoxyethylene surfactant.

* * * * *